(12) United States Patent
Smith et al.

(10) Patent No.: US 7,886,763 B2
(45) Date of Patent: Feb. 15, 2011

(54) FAUCET INCORPORATING VANDAL RESISTANT FEATURES

(75) Inventors: Matthew S. Smith, Westlake, OH (US); Allen L. Talley, Hudson, OH (US)

(73) Assignee: Moen Incorporated, North Olmsted, OH (US)

( * ) Notice: Subject to any disclaimer, the term of this patent is extended or adjusted under 35 U.S.C. 154(b) by 516 days.

(21) Appl. No.: 11/513,551

(22) Filed: Aug. 31, 2006

(65) Prior Publication Data

US 2008/0053531 A1   Mar. 6, 2008

(51) Int. Cl.
E03B 3/00 (2006.01)
(52) U.S. Cl. .......................................... 137/382; 4/675
(58) Field of Classification Search ............... 4/675, 4/676, 678, 695, 692; 137/382, 359, 15.01; 403/3; 251/219, 220
See application file for complete search history.

(56) References Cited

U.S. PATENT DOCUMENTS

| | | | |
|---|---|---|---|
| 624,628 A | 5/1899 | Corey, Jr. | |
| 1,231,164 A | 6/1917 | Jahns et al. | |
| RE17,034 E * | 7/1928 | Bloch et al. | 137/625.5 |
| 2,587,862 A * | 3/1952 | Krucki | 403/253 |
| 3,026,898 A * | 3/1962 | Weller | 137/359 |
| 3,067,436 A * | 12/1962 | Freibott | 4/675 |
| 3,301,580 A * | 1/1967 | Greitzer | 403/23 |
| 4,101,989 A | 7/1978 | Lagarelli | |
| 4,554,944 A | 11/1985 | Daghe et al. | |
| 4,620,328 A | 11/1986 | Lissau | |
| 4,829,632 A | 5/1989 | Freier et al. | |
| 4,961,443 A | 10/1990 | Buccicone et al. | |
| 5,031,657 A | 7/1991 | Stairs | |
| 5,039,062 A | 8/1991 | England et al. | |
| 5,257,645 A | 11/1993 | Scully et al. | |
| 5,401,133 A | 3/1995 | Kuchler | |
| 5,632,301 A | 5/1997 | Julicher | |
| 5,664,447 A | 9/1997 | Neeley | |
| 5,722,450 A | 3/1998 | Julicher | |
| 5,804,769 A | 9/1998 | Morena | |
| 5,971,354 A | 10/1999 | Ecklund | |
| 6,170,799 B1 | 1/2001 | Nelson | |
| 6,276,662 B1 | 8/2001 | Bugatti | |
| 6,345,643 B1 * | 2/2002 | Ko | 137/315.12 |
| 6,438,771 B1 | 8/2002 | Donath, Jr. et al. | |
| 6,981,692 B2 | 1/2006 | Hong | |
| 2002/0124309 A1 | 9/2002 | Donath, Jr. et al. | |
| 2004/0068837 A1 | 4/2004 | Bertani | |
| 2005/0138726 A1 | 6/2005 | Daly | |

* cited by examiner

Primary Examiner—Stephen Hepperle
Assistant Examiner—Macade Brown
(74) Attorney, Agent, or Firm—Calfee, Halter & Griswold LLP

(57) ABSTRACT

A faucet incorporating vandal resistant features is provided to limit the possibility of tampering by limiting access to the valve cartridges of the faucet. The faucet includes a valve cartridge and a handle bat operatively attached to the valve cartridge. A hub covering the valve cartridge is freely rotatable about the valve cartridge, and a mechanical fastener attaching the handle bat to the valve cartridge includes a specially-configured driver pattern.

18 Claims, 5 Drawing Sheets

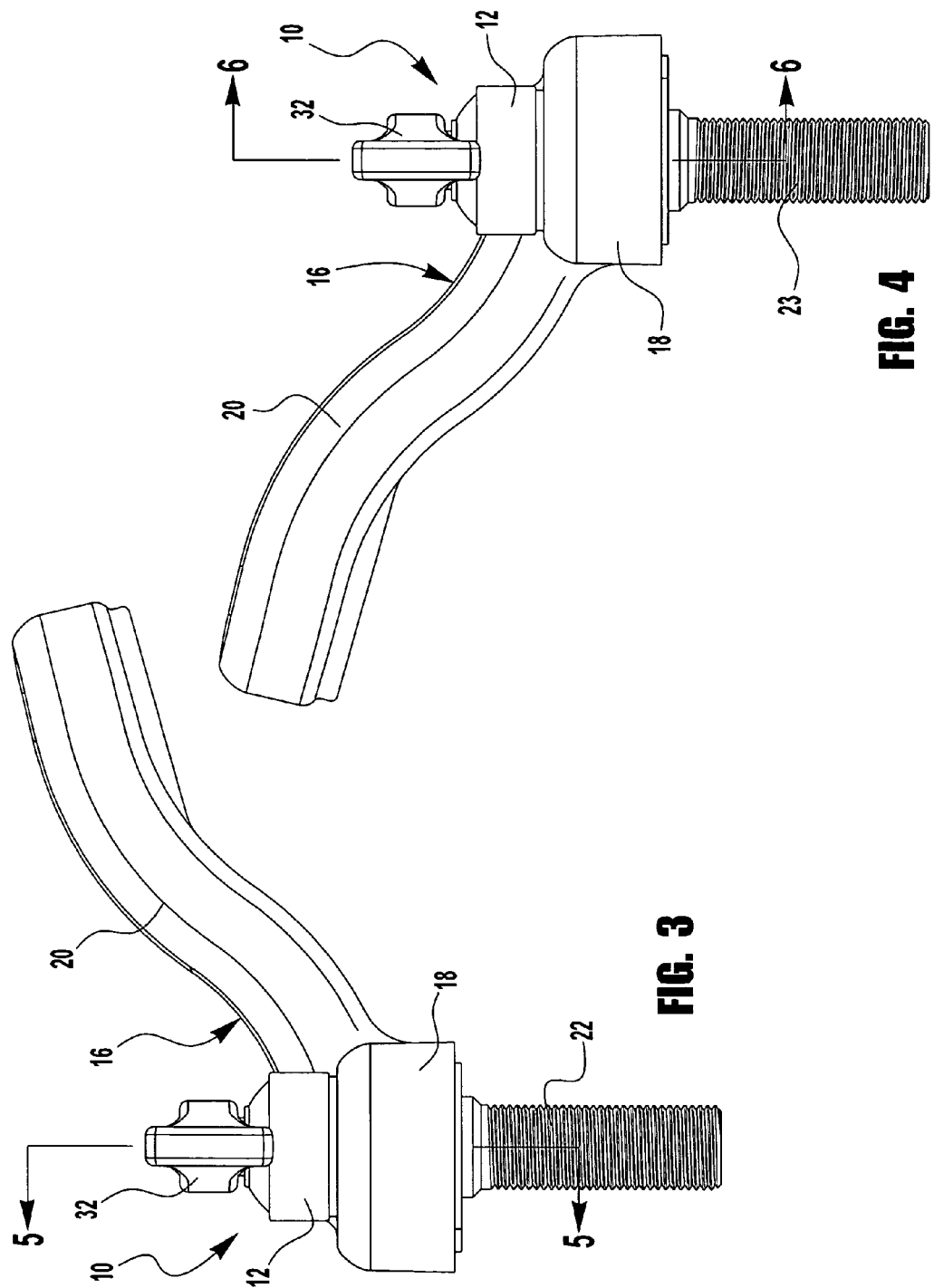

FAUCET INCORPORATING VANDAL RESISTANT FEATURES

TECHNICAL FIELD

The present invention is generally related to a faucet incorporating vandal resistant features serving to protect the faucet from deliberate damage. More particularly, the present invention is related to a faucet incorporating vandal resistant features to prevent tampering by limiting access to the valve cartridges. More specifically, the present invention is related to a faucet incorporating vandal resistant hubs and vandal resistant handle connections provided to limit access to the valve cartridges.

BACKGROUND

Typically, two-handle faucets have handle hubs that are either integrally formed with the handle bats or fixedly attached to the faucet escutcheon. The faucets incorporating these types of handle hubs are susceptible to tampering. For example, with readily available tools, vandals can remove these handle hubs to gain access to the valve cartridges of the two-handle faucets. Deliberate damage to or removal of the valve cartridges can cause significant water leakage from such faucets.

When a two-handle faucet includes handle hubs integrally formed with the handle bats, the combination handle hubs and handle bats are typically attached to the stems of the valve cartridges using mechanical fasteners. The valve cartridges are maintained in position in the two-handle faucet using cartridge retainers screwed onto collars formed on the faucet escutcheon. Tampering with such a two-handle faucet usually occurs when the combination handle hubs and handle bats are removed from the faucet, and the cartridge retainers are exposed. When exposed, the cartridge retainers can be unscrewed from the collars to remove the valve cartridges from the faucet or be subjected to excessive torquing. Excessive torquing can cause the connection between the cartridge retainers and collars to be compromised, and result in damage to the valve cartridges. Damage to the valve cartridges or removal thereof can result in significant water leakage from the faucet.

When a two-handle faucet includes handle hubs that are fixedly attached to the faucet escutcheon, the handle bats are attached to the stems using standard mechanical fasteners, and the handle hubs are typically screwed onto collars formed on the faucet escutcheon. Such handle hubs, like the above-discussed cartridge retainers, serve in maintaining the position of the valve cartridges in the two-handle faucet, and include apertures through which the stems of the valve cartridges extend. Tampering with such a two-handle faucet usually occurs in two ways. For example, because the handle bats are attached to the stems using standard mechanical fasteners, the handle bats can be removed from the stems using standard tools. When the handle bats are removed from the stems, the handle hubs can be unscrewed from the collars to remove the valve cartridges from the faucet. Furthermore, excessive torquing of the handle hubs, with or without removal of the handle bats, can cause the connection between the handle hubs and the collars to be compromised, and result in damage to the valve cartridges. As discussed above, damage to the valve cartridges or removal thereof from the faucet can result in significant water leakage from the faucet.

Therefore, there is a need for a two-handle faucet incorporating vandal resistant features to limit the possibility of tampering by limiting access to the valve cartridges of the faucet.

SUMMARY

The present invention contemplates a faucet including a valve cartridge, a handle bat operatively attached to the valve cartridge, and a hub covering the valve cartridge, the hub being freely rotatable about the valve cartridge.

The present invention further contemplates a faucet including a valve cartridge, a handle bat operatively attached to the valve cartridge, and a mechanical fastener used to attach the handle bat to the valve cartridge, the mechanical fastener including a specially-configured driver pattern.

The present invention still further contemplates a faucet including a valve cartridge, a handle bat operatively attached to the valve cartridge, a hub covering the valve cartridge, the hub being freely rotatable about the valve cartridge, and a mechanical fastener used to attach the handle bat to the valve cartridge, the mechanical fastener including a specially-configured driver pattern.

Further embodiments, variations, and enhancements are also described herein.

BRIEF DESCRIPTION OF THE DRAWINGS

FIG. 3 is a left side elevational assembled view of the faucet depicted in FIG. 1;

FIG. 4 is a right side elevational assembled view of the faucet depicted in FIG. 1;

DETAILED DESCRIPTION

Figure 1:
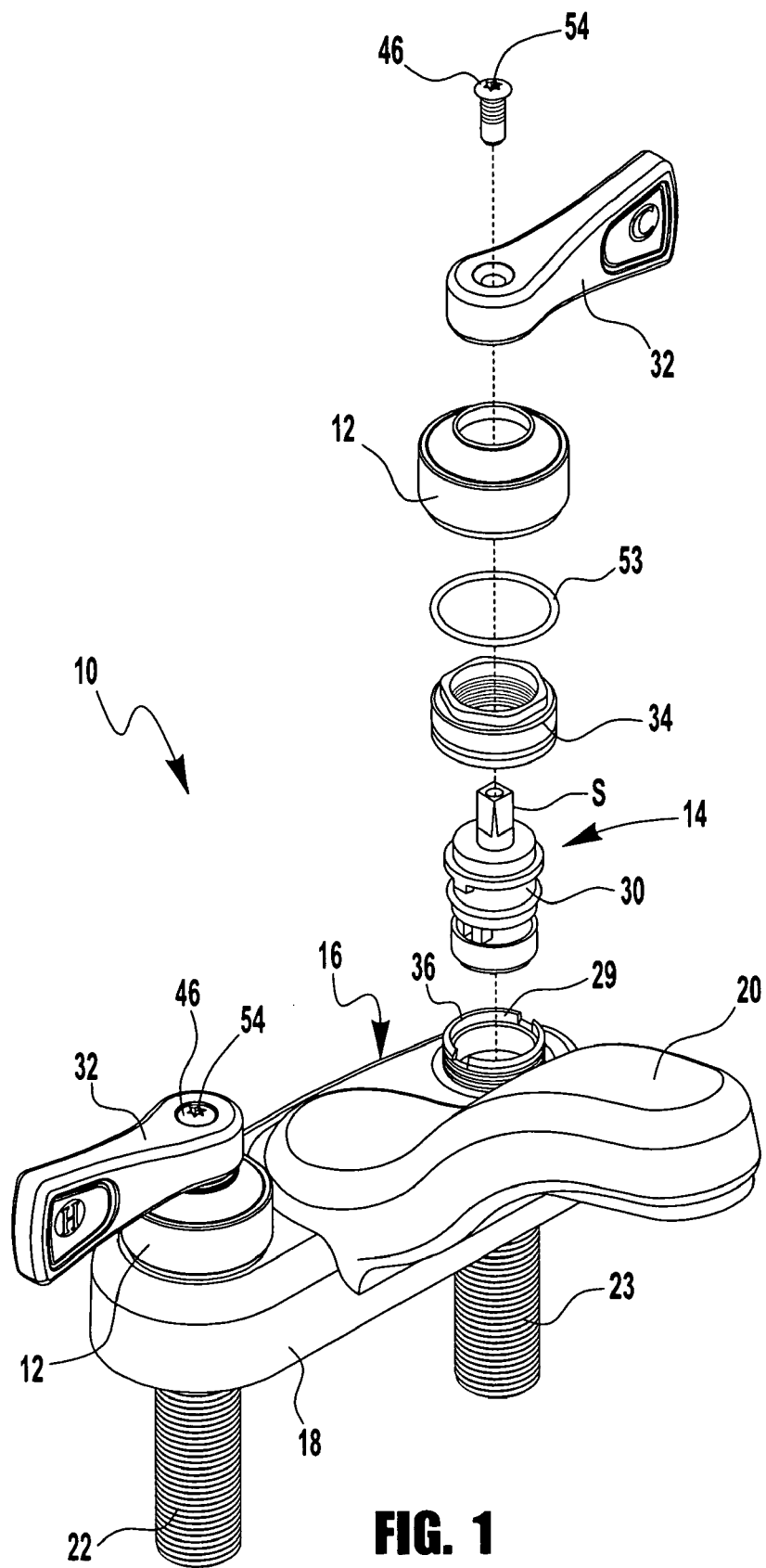
FIG. 1 is a perspective exploded view of a faucet incorporating vandal resistant features according to the present invention.
Figure 2:
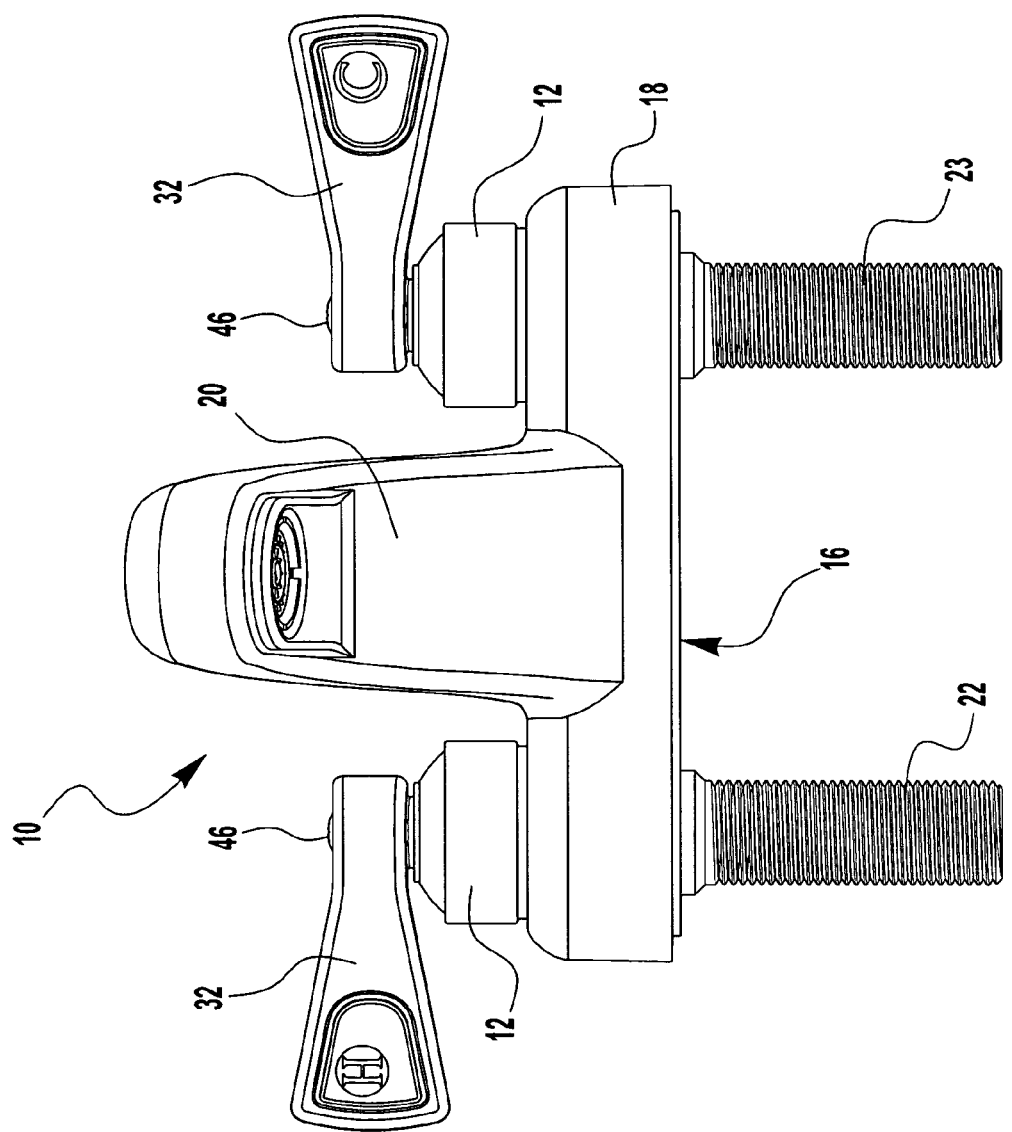
FIG. 2 is a front elevational assembled view of the faucet depicted in FIG. 1.

The vandal resistant faucet according to the present invention is generally indicated by the numeral 10 in the accompanying drawings. As discussed below, the vandal resistant faucet 10 includes various vandal resistant features. Given the incorporation of the vandal resistant features into the faucet 10, the possibility of deliberate damage to or removal of valve cartridges 30 due to tampering can be limited.

The vandal resistant faucet 10 depicted in the accompanying drawings is a centerset lavatory faucet, but, as those skilled in the art will appreciate, the present invention is not limited thereto. The vandal resistant features described below can, for example, be incorporated in widespread lavatory faucets, kitchen faucets, and other types of one-handle and two-handle faucets.

One of the vandal resistant features incorporated in the faucet 10 are hubs 12. The faucet 10 includes two (2) valve assemblies 14 provided to control the flow of hot and cold water therethrough, and the hubs 12 serve in protecting portions of the valve assemblies 14. As shown in FIGS. 1-6, the faucet 10 includes a faucet body 16 formed by an escutcheon 18 and a spout 20. A hot water inlet pipe nipple 22 (FIGS. 1, 2, 3, and 5) and a cold water inlet pipe nipple 23 (FIGS. 1, 2, 4, and 6) are integrally formed with the escutcheon 18, and are respectively connected with hot and cold water supply pipes (not shown). To attach the faucet 10 to a sink deck D (FIGS. 5 and 6) the hot water inlet pipe nipple 22 and the cold water inlet pipe nipple 23 are received through apertures X and Y, respectively, formed in the sink deck D. Thereafter, mechanical fasteners (not shown) are received on threads formed on the hot water inlet pipe nipple 22 and the cold water inlet pipe nipple 23 to secure the faucet body 16 to the sink deck D.

Figure 5:
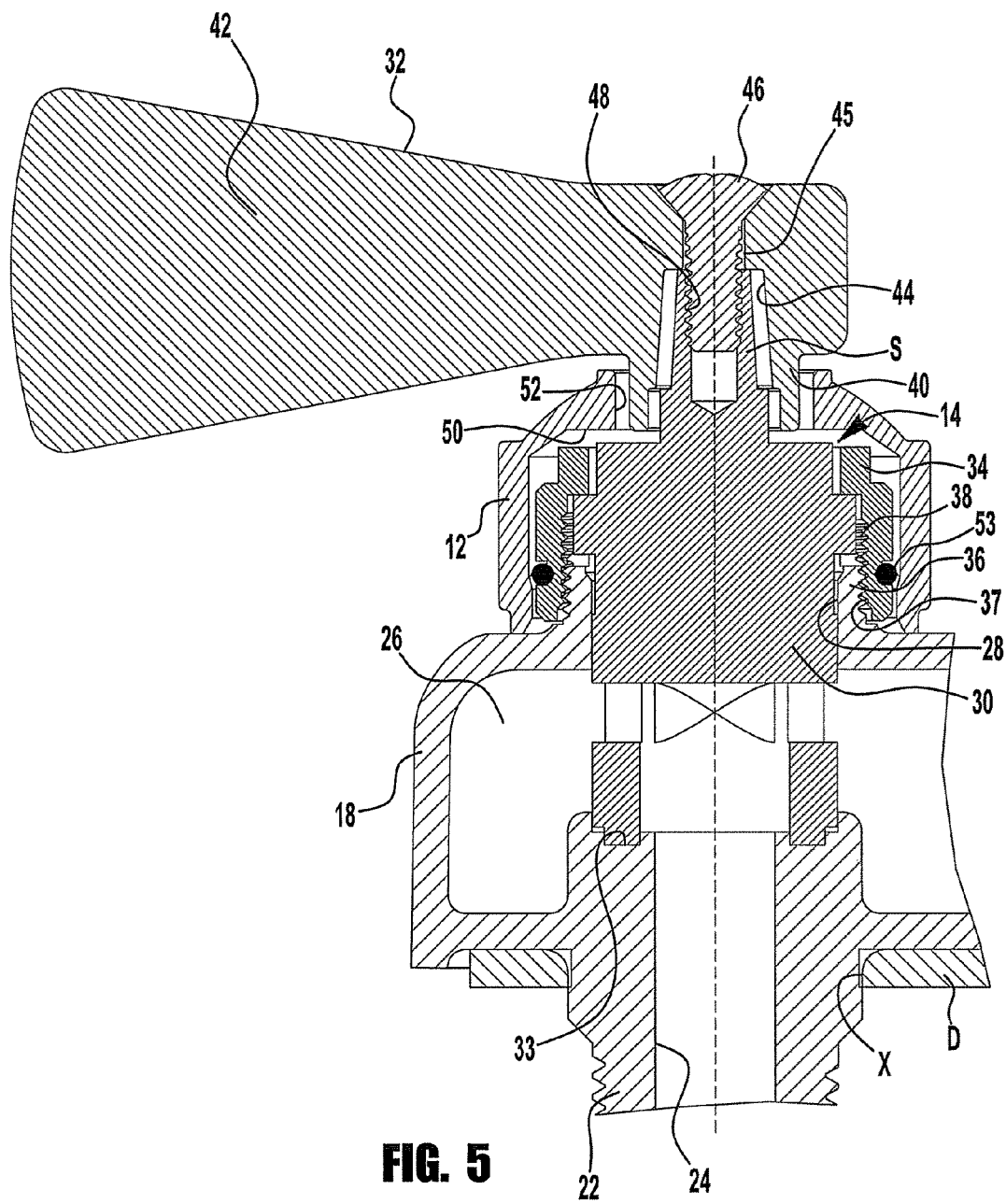
FIG. 5 is an enlarged fragmentary cross-sectional view taken along Line 5-5 of FIG. 3.
Figure 6:
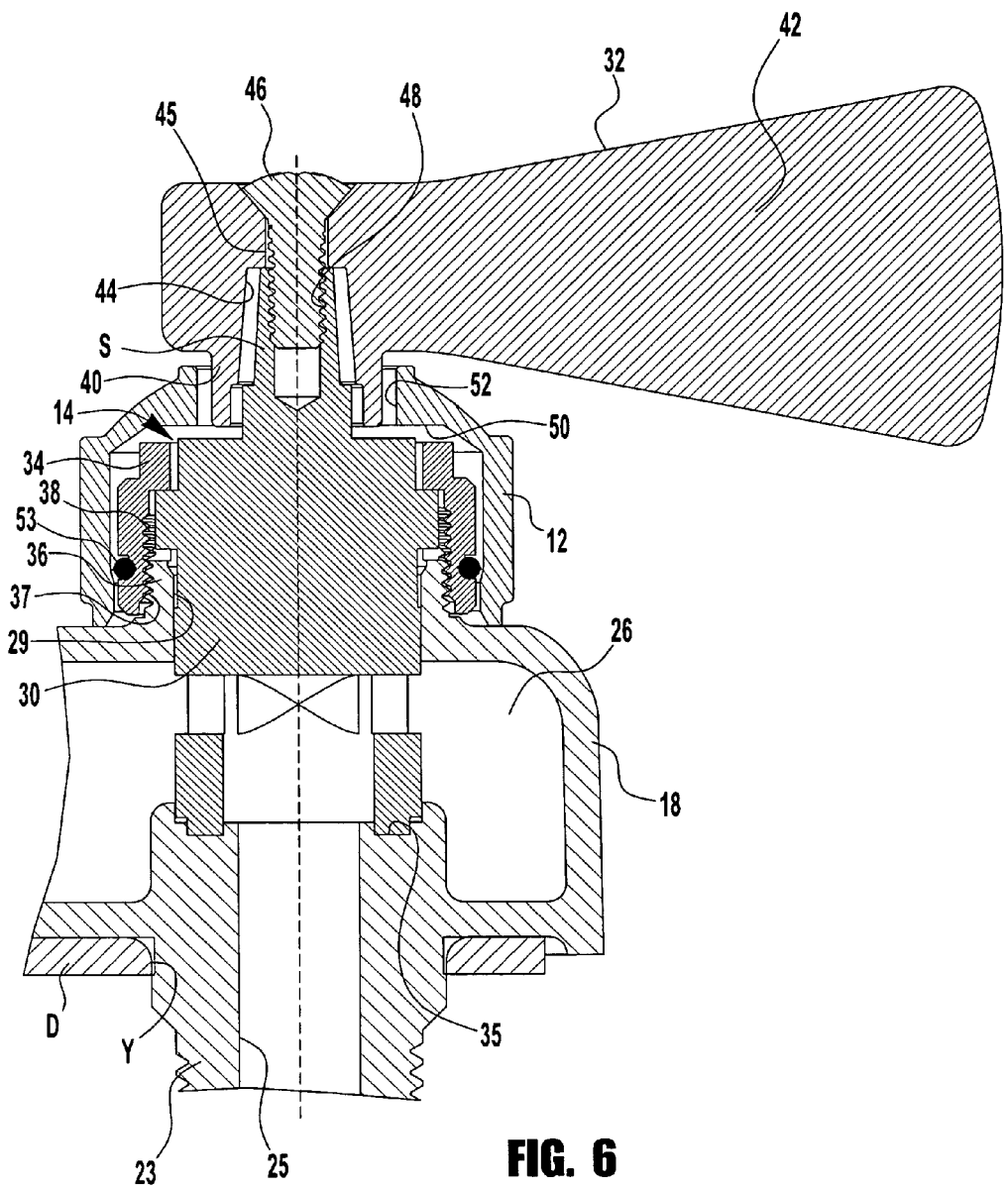
FIG. 6 is an enlarged fragmentary cross-sectional view taken along Line 6-6 of FIG. 4.

Water from the hot and cold water supply pipes respectively flows through a hot water passageway 24 (FIG. 5) formed through the hot water inlet pipe nipple 22 and a cold water passageway 25 (FIG. 6) formed through the cold water inlet pipe nipple 23. The valve assemblies 14 are provided to control the flow of water from the hot water passageway 24 and the cold water passageway 25 into, as shown in FIGS. 5 and 6, a mixing chamber 26 formed in the escutcheon 18. The mixing chamber 26 is used to mix water from the hot and cold supply lines flowing through the valve assemblies 14 before the mixed water exits the spout 20 through a spout passageway (not shown).

The valve assemblies 14 control the volume of hot and cold water flowing from the hot and cold water supply pipe into the mixing chamber 26. As such, through actuation thereof, the valve assemblies 14 control the temperature of the mixed water ultimately exiting the spout 20. One of the valve assemblies 14 is associated with an aperture 28 provided in the escutcheon 18 (FIG. 5) and one of the valve assemblies 14 is associated with an aperture 29 provided in the escutcheon 18 (FIGS. 1 and 6). The valve assembly 14 associated with the aperture 28 controls the volume of hot water flowing from the hot water passageway 24 into the mixing chamber 26 and the valve assembly 14 associated with the aperture 29 controls the volume of cold water flowing from the cold water passageway 25 into the mixing chamber 26.

The valve assemblies 14 include valve cartridges 30. One of the valve cartridges 30 is received in the aperture 28 (FIG. 5) and one of the valve cartridges 30 is received in the apertures 29 (FIG. 6). The valve cartridge 30 received in the aperture 28 interfaces with a shoulder 33 provided adjacent the outlet of the hot water passageway 24, and the valve cartridge 30 received in the aperture 29 interfaces with a shoulder 35 provided adjacent the outlet of the cold water passageway 25.

The valve cartridges 30 have handle bats 32 operatively attached thereto. As shown best in FIGS. 5 and 6, the handle bats 32 are attached to stems S of the valve cartridges 30. Via movement of the handle bats 32, the stems S can be rotated to actuate the valve cartridges 30 between opened and closed positions. When the valve cartridges 30 are closed, water from the hot water passageway 24 and the cold water passageway 25 is prevented from exiting the valve cartridges 30. When the valve cartridges 30 are opened, water from the hot water passageway 24 and the cold water passageway 25 is permitted to exit the valve cartridges 30. Furthermore, depending on the degrees to which the valve cartridges 30 are opened, the volume of water from the hot water passageway 24 and the cold water passageway 25 permitted to flow into the mixing chamber 16 can be increased.

Cartridge retainers 34 serve in maintaining the valve cartridges 30 in position relative to the escutcheon 18. The cartridge retainers 34 are received on collars 36 extending upwardly from the escutcheon 18. The collars 36 partially define the apertures 28 and 29 in which the valve cartridges 30 are received, and include exterior threads 37 provided to compliment threads 38 provided on the interior of the cartridge retainers 34. The cartridge retainers 34 also serve to prevent water from escaping the mixing chamber 26. By maintaining the valve cartridges 30 in position relative to the escutcheon 18, the cartridge retainers 34 prevent water from escaping the mixing chamber 26 through the apertures 28 and 29 past the valve cartridges 30.

Actuation of the valve cartridges 30, as discussed above, is facilitated by movement of the handle bats 32 attached to the stems S of the valve cartridges 30. The handle bats 32 each include an attachment portion 40 and an engagement portion 42 depending from the attachment portion 40. As shown best in FIGS. 5 and 6, the attachment portions 40 each include a stem receiving aperture 44 and a fastener receiving aperture 45. To attach the handle bats 32 to the valve cartridges 30, the stem receiving apertures 44 receive the stems S of the valve cartridges 30, and the fastener receiving apertures 45 receive mechanical fasteners 46. Thereafter, the mechanical fasteners 46, as shown in FIGS. 5 and 6, are received in threaded apertures 48 provided in the stems S to secure attachment of the handle bats 32 to the valve cartridges 30.

As shown best in FIGS. 5 and 6, the hubs 12 cover the valve cartridges 30 and the cartridge retainers 34, and include interior cavities 50 and apertures 52 into the interior cavities 50. For example, when hubs 12 are provided on the faucet 10, the stems S extend through the apertures 52, and the valve cartridges 30 and the cartridge retainers 34 are received in the interior cavities 50. Furthermore, o-rings 53 (FIGS. 1, 5 and 6) provided around the cartridge retainers 34 serve in spacing the interior cavities 50 from contact with the cartridge retainers 34. The mechanical fasteners 46 used to attach the handle bats 32 to the valve cartridges 30 are also used to maintain the position of the hubs 12 between the escutcheon 18 and the handle bats 32 covering the valve cartridges 30 and cartridge retainers 34.

As discussed above, the hubs 12 are one of the vandal resistant features incorporated in the faucet 10. The hubs 12 serve in preventing damage to or removal of the valve cartridges 30 by covering the valve cartridges 30 and the cartridge retainers 34 and by correspondingly limiting access thereto. Furthermore, because the hubs 12 are not attached directly to the escutcheon 16, the valve cartridges 30, or the cartridge retainers 34, the hubs 12 are freely rotatable about the valve cartridges 30 and the cartridge retainers 34, and cannot be damaged by excessive torquing thereof.

The mechanical fasteners 46 are another of the vandal resistant features incorporated in the faucet 10. The mechanical fasteners 46 each include a specially-configured driver pattern 54. The specially-configured driver pattern 54 is an uncommon driver pattern requiring special tools for engagement thereof. The specially-configured driver pattern 54 and the corresponding difficulty of obtaining a tool adapted for engagement thereof aid in preventing unauthorized removal of the mechanical fasteners 46. As such, the specially-configured driver pattern 54 serves to effectively limit access to the valve cartridges 30 and the cartridge retainers 34 by aiding to prevent removal of the hubs 12. As depicted in FIG. 1, the specially-configured driver pattern incorporated on each of the mechanical fasteners 46 is a TORX® star-shaped hexalobular drive pattern. However, as those skilled in the art will appreciate, other specially-configured driver patterns can be utilized. For example, the mechanical fasteners 46 could include a variety of star-shaped driver patterns having at least five (5) lobes.

While in accordance with the Patent Statutes, only the best mode and exemplary embodiments have been presented and described in detail, it is to be understood that the invention is not limited thereto or thereby.

The invention claimed is:
1. A faucet, comprising:
a valve cartridge;
a handle operable to attach to said valve cartridge, said handle having a downwardly extending portion; and a hub operable to cover said valve cartridge and to freely rotate about said valve cartridge, said hub having an upper surface, said upper surface of said hub having an opening;

wherein, when said handle is operably attached to said valve cartridge and said hub is operably covering said valve cartridge, said downwardly extending portion of said handle and said upper surface of said hub overlap to prevent access to said valve cartridge, and said downwardly extending portion of said handle extends into said opening in said upper surface of said hub.

2. The faucet of claim 1, wherein, when said handle is operably attached to said valve cartridge, axial movement of said hub along said valve cartridge is restricted.

3. The faucet of claim 1, wherein said hub is operable to be maintained over said valve cartridge by said handle.

4. The faucet of claim 1, further comprising a mechanical fastener operable to attach said handle to said valve cartridge.

5. The faucet of claim 1, further comprising an escutcheon, wherein said hub is operable to be positioned between said escutcheon and said handle.

6. The faucet of claim 5, wherein said handle, said hub, and said escutcheon are operable to completely cover said valve cartridge.

7. A faucet, comprising:
a valve cartridge;
a handle operable to attach to said valve cartridge, said handle having a downwardly extending portion;
a cartridge retainer operable to attach to said valve cartridge; and
a hub operable to cover said valve cartridge and said cartridge retainer and to freely rotate about said valve cartridge and said cartridge retainer, said hub having an upper surface, said upper surface of said hub having an opening;
wherein, when said handle and said cartridge retainer are operably attached to said valve cartridge and said hub is operably covering said valve cartridge and said cartridge retainer, said downwardly extending portion of said handle and said upper surface of said hub overlap to prevent access to said valve cartridge and said cartridge retainer, and said downwardly extending portion of said handle extends into said opening in said upper surface of said hub.

8. The faucet of claim 7, wherein, when said handle is operably attached to said valve cartridge, axial movement of said hub along said valve cartridge is restricted.

9. The faucet of claim 7, wherein said hub is operable to be maintained over said valve cartridge by said handle.

10. The faucet of claim 7, further comprising a mechanical fastener operable to attach said handle to said valve cartridge.

11. The faucet of claim 7, further comprising an escutcheon, wherein said hub is operable to be positioned between said escutcheon and said handle.

12. The faucet of claim 11, wherein said handle, said hub, and said escutcheon are operable to completely cover said valve cartridge and said cartridge retainer.

13. A faucet, comprising:
a valve cartridge;
a handle operable to attach to said valve cartridge, said handle having a downwardly extending portion;
a cartridge retainer operable to attach to said valve cartridge, said cartridge retainer having a spacer extending around an outer perimeter of said cartridge retainer; and
a hub operable to cover said valve cartridge and said cartridge retainer and to freely rotate about said valve cartridge and said cartridge retainer, said hub having an upper surface, said upper surface of said hub having an opening;
wherein, when said handle and said cartridge retainer are operably attached to said valve cartridge and said hub is operably covering said valve cartridge and said cartridge retainer, an outer perimeter of said spacer is less than an inner perimeter of a portion of said hub adjacent to said spacer, said downwardly extending portion of said handle and said upper surface of said hub overlap to prevent access to said valve cartridge and said cartridge retainer, and said downwardly extending portion of said handle extends into said opening in said upper surface of said hub.

14. The faucet of claim 13, wherein, when said handle is operably attached to said valve cartridge, axial movement of said hub along said valve cartridge is restricted.

15. The faucet of claim 13, wherein said hub is operable to be maintained over said valve cartridge by said handle.

16. The faucet of claim 13, further comprising a mechanical fastener operable to attach said handle to said valve cartridge.

17. The faucet of claim 13, further comprising an escutcheon, wherein said hub is operable to be positioned between said escutcheon and said handle.

18. The faucet of claim 17, wherein said handle, said hub, and said escutcheon are operable to completely cover said valve cartridge and said cartridge retainer.

* * * * *